(12) United States Patent
Yang et al.

(10) Patent No.: US 11,483,627 B2
(45) Date of Patent: Oct. 25, 2022

(54) METHOD AND APPARATUS FOR PROVIDING BROADCAST SERVICE

(71) Applicant: Samsung Electronics Co., Ltd., Suwon-si (KR)

(72) Inventors: Hyun-Koo Yang, Seoul (KR);
Dong-Yeon Kim, Seoul (KR);
Kyung-Mo Park, Seoul (KR);
Jae-Hyeon Bae, Seoul (KR);
Young-Wan So, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/520,195

(22) Filed: Nov. 5, 2021

(65) Prior Publication Data

US 2022/0060798 A1    Feb. 24, 2022

Related U.S. Application Data

(63) Continuation of application No. 16/048,899, filed on Jul. 30, 2018, now Pat. No. 11,172,268.
(Continued)

(30) Foreign Application Priority Data

Oct. 31, 2017  (KR) .................. 10-2017-0143834
Dec. 4, 2017   (KR) .................. 10-2017-0165331
Dec. 22, 2017  (KR) .................. 10-2017-0178702

(51) Int. Cl.
*H04N 21/6334* (2011.01)
*H04N 21/438* (2011.01)
(Continued)

(52) U.S. Cl.
CPC ....... *H04N 21/63345* (2013.01); *G06F 21/64* (2013.01); *H04N 21/2362* (2013.01); *H04N 21/438* (2013.01); *H04N 21/64322* (2013.01)

(58) Field of Classification Search
CPC ......... H04N 21/2362; H04N 21/64322; H04N 21/4345; H04N 21/6112; H04N 21/435
See application file for complete search history.

(56) References Cited

U.S. PATENT DOCUMENTS 10,412,132 B2    9/2019  Yang et al.
11,172,268 B2 *  11/2021 Yang .................... H04N 21/438
(Continued)

FOREIGN PATENT DOCUMENTS

WO    2016/120619 A1    8/2016
WO    2016/133296 A1    8/2016

OTHER PUBLICATIONS

Korean Office Action dated Jan. 12, 2022, issued in Korean Patent Application No. 10-2017-0178702.
(Continued)

*Primary Examiner* — Jason Salce
(74) *Attorney, Agent, or Firm* — Jefferson IP Law, LLP

(57) ABSTRACT

A method for providing a broadcast service is provided. The method includes transmitting a user datagram protocol (UDP)/internet protocol (IP) packet including a first message, the first message containing information about a message to be signed and transmitted, and transmitting a moving picture experts group (MPEG) media transport protocol (MMTP) packet including a second message, the second message containing information about the broadcast service and information indicating whether the information about the broadcast service is signed. The first message includes an identifier of a key used to verify a signature of the message to be transmitted and signed and an identifier of a hash
(Continued)

algorithm used to calculate a hash value of the message to be transmitted and signed.

8 Claims, 10 Drawing Sheets

Related U.S. Application Data

(60) Provisional application No. 62/539,039, filed on Jul. 31, 2017.

(51) Int. Cl.
  *H04N 21/643* (2011.01)
  *G06F 21/64* (2013.01)
  *H04N 21/2362* (2011.01)

(56) References Cited

U.S. PATENT DOCUMENTS

| | | |
|---|---|---|
| 2007/0143854 A1 | 6/2007 | Wasilewski |
| 2010/0246955 A1 | 9/2010 | Wright et al. |
| 2012/0005481 A1 | 1/2012 | Kusudo et al. |
| 2012/0096504 A1 | 4/2012 | Waller et al. |
| 2013/0246785 A1 | 9/2013 | Buckley et al. |
| 2014/0010366 A1 | 1/2014 | Quinn et al. |
| 2016/0277778 A1 | 9/2016 | Kwon et al. |
| 2016/0364551 A1 | 12/2016 | Bouazizi et al. |
| 2017/0054520 A1 | 2/2017 | Kwak et al. |
| 2017/0105013 A1 | 4/2017 | Fairhurst et al. |
| 2017/0187727 A1 | 6/2017 | Tanaka et al. |
| 2018/0006747 A1 | 1/2018 | Yamakage et al. |
| 2018/0034870 A1 | 2/2018 | Yang et al. |
| 2018/0249167 A1 | 8/2018 | Deshpande et al. |
| 2019/0052937 A1 | 2/2019 | Malamal Vadakital et al. |

OTHER PUBLICATIONS

International Search Report dated Oct. 25, 2018; International Application No. PCT/KR2018/008701.

Extended European Search Report dated Mar. 25, 2020, issued in European Patent Application No. 18840965.0.

ITU, Service configuration, media transport protocol, and signaling information for MMT-broadcasting systems, 2015, ITU, pp. 4-5, 9-13 and 17 (Year: 2015).

\* cited by examiner

FIG.4

METHOD AND APPARATUS FOR PROVIDING BROADCAST SERVICE

CROSS-REFERENCE TO RELATED APPLICATION(S)

This application is a continuation application of prior application Ser. No. 16/048,899, filed on Jul. 30, 2018, which application is based on and claims priority under 35 U.S.C. § 119(e) of a U.S. Provisional application Ser. No. 62/539,039, filed on Jul. 31, 2017, in the U.S. Patent and Trademark Office, and under 35 U.S.C. § 119(a) of a Korean patent application number 10-2017-0143834, filed on Oct. 31, 2017, in the Korean Intellectual Property Office, of a Korean patent application number 10-2017-0165331, filed on Dec. 4, 2017, in the Korean Intellectual Property Office, and of a Korean patent application number 10-2017-0178702, filed on Dec. 22, 2017, in the Korean Intellectual Property Office, the disclosure of each of which is incorporated by reference herein in its entirety.

BACKGROUND

1. Field

The disclosure relates to methods and apparatuses for providing broadcast services. More particularly, the disclosure relates to security methods and apparatuses for providing broadcast services.

2. Description of Related Art

To provide broadcast services, there may be provided information for receiving and using components of each service. While providing such information, variations or errors in the information may occur due to, e.g., an external involvement. Where the recipient is unaware of the occurrence of the variations or errors in the information, he or she cannot correctly receive the service because the varied or erroneous information is processed. To prevent this, a need exists for a security method and apparatus for providing broadcast services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, the disclosure provides apparatuses and methods for providing broadcast services, and more specifically, security methods and apparatuses for providing broadcast services.

Accordingly, an aspect of the disclosure is to provide a method for providing a broadcast service. The method includes transmitting a user datagram protocol (UDP)/internet protocol (IP) packet including a first message, the first message containing information about a message to be signed and transmitted, and transmitting a moving picture experts group (MPEG) media transport protocol (MMTP) packet including a second message, the second message containing information about the broadcast service and information indicating whether the information about the broadcast service is signed. The first message includes an identifier of a key used to verify a signature of the message to be signed and transmitted and an identifier of a hash algorithm used to calculate a hash value of the message to be signed and transmitted.

When the information about the broadcast service has an MPEG-defined format, the second message may be an MPEG media transport (MMT)-format message, and when the information about the broadcast service has an advanced television systems committee (ATSC)-defined format, the second message may be an ATSC-format message.

The information indicating whether the information about the broadcast service is signed may include a one-bit flag. When the flag is 1, the information indicating whether the information about the broadcast service is signed may indicate that the information about the broadcast service is signed.

When the information about the broadcast service is signed, the second message may further include information for identifying the signature.

The signature may be formed by calculating the hash value using the hash algorithm and encrypting the hash value using the key.

In accordance with another aspect of the disclosure, a method for receiving a broadcast service is provided. The method includes receiving a user datagram protocol (UDP)/internet protocol (IP) packet including a first message, the first message containing information about a message to be signed and transmitted, and receiving a moving picture experts group (MPEG) media transport protocol (MMTP) packet including a second message, the second message containing information about the broadcast service and information indicating whether the information about the broadcast service is signed. The first message includes an identifier of a key used to verify a signature of the message to be signed and transmitted and an identifier of a hash algorithm used to calculate a hash value of the message to be signed and transmitted.

When the information about the broadcast service has an MPEG-defined format, the second message may be an MMT-format message, and when the information about the broadcast service has an advanced television systems committee (ATSC)-defined format, the second message may be an ATSC-format message.

The information indicating whether the information about the broadcast service is signed may include a one-bit flag. When the flag is 1, the information indicating whether the information about the broadcast service is signed may indicate that the information about the broadcast service is signed.

When the information about the broadcast service is signed, the second message may further include information for identifying the signature.

The method may further comprise calculating a first hash value of the second message using the hash algorithm and obtaining a second hash value using the key, the second hash value obtained by interpreting the signature and when the first hash value is identical to the second hash value, determining that the second message is valid.

In accordance with another aspect of the disclosure, a transmitting device is provided. The transmitting device includes a transmitter, a receiver, and at least one processor electrically coupled to the transmitter and receiver. The at least one processor is configured to control the transmitter to transmit a user datagram protocol (UDP)/internet protocol (IP) packet including a first message, the first message containing information about a message to be signed and transmitted, and control the transmitter to transmit a moving picture experts group (MPEG) media transport protocol (MMTP) packet including a second message, the second message containing information about the broadcast service and information indicating whether the information about the broadcast service is signed. The first message includes an identifier of a key used to verify a signature of the message to be signed and transmitted and an identifier of a hash algorithm used to calculate a hash value of the message to be signed and transmitted.

In accordance with another aspect of the disclosure, a receiving device is provided. The receiving device includes a transmitter, a receiver, and at least one processor electrically coupled to the transmitter and receiver. The at least one processor is configured to control the receiver to receive a user datagram protocol (UDP)/internet protocol (IP) packet including a first message, the first message containing information about a message to be signed and transmitted, and control the receiver to receive a moving picture experts group (MPEG) media transport protocol (MMTP) packet including a second message, the second message containing information about the broadcast service and information indicating whether the information about the broadcast service is signed. The first message includes an identifier of a key used to verify a signature of the message to be signed and transmitted and an identifier of a hash algorithm used to calculate a hash value of the message to be signed and transmitted.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a view illustrating an advanced television systems committee (ATSC) 3.0 recipient protocol stack according to an embodiment of the disclosure;

Throughout the drawings, like reference numerals will be understood to refer to like parts, components, and structures.

DETAILED DESCRIPTION

Figure 1:
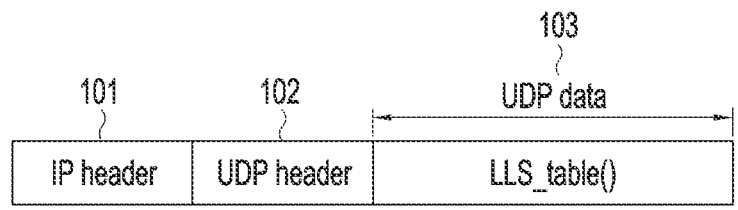
FIG. 1 is a view illustrating a user datagram protocol (UDP)/internet protocol (IP) packet containing a low level signaling (LLS) table according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For use in embodiments of the disclosure, common terms widely used as possible have been chosen considering functions in the disclosure, but the terms may be varied depending on the intent of one of ordinary skill in the art or case laws or the advent of new technologies.

In various embodiments of the disclosure, the "module" or "part" may perform at least one function or operation and may be implemented in hardware, software, or a combination thereof. Further, a plurality of "modules" or a plurality of "parts" may be integrated in at least one module and may be implemented in at least one processor (not shown), unless particularly required to be implemented in a particular type of hardware.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

As used herein, the term "and/or" includes any and all combinations of one or more of the associated listed items. For examples, "A or B" may include A, or include B, or include both A and B.

Ordinal numbers as herein used, such as "first," "second," etc., may modify various components of various embodiments, but do not limit those components. For example, these terms do not limit the order and/or importance of the components. These terms are only used to distinguish one component from another. For example, a first user device and a second user device are different user devices from each other. For example, a first component may be denoted a second component, and vice versa without departing from the scope of the disclosure.

According to an embodiment, when a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the disclosure. It is to be understood that the singular forms "a," "an," and "the" include plural references unless the context clearly dictates otherwise.

According to an embodiment, unless otherwise defined, all terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Security methods for providing broadcast services are described below with reference to FIGS. 1 to 4 according to an embodiment.

FIG. 1 is a view illustrating a user datagram protocol (UDP)/internet protocol (IP) packet containing a low level signaling (LLS) table according to an embodiment of the disclosure.

Figure 2:
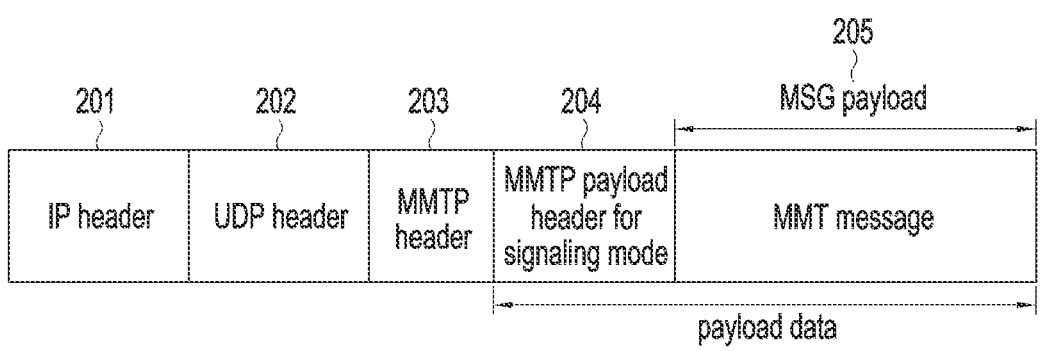
FIG. 2 is a view illustrating a moving picture experts group (MPEG) media transport protocol (MMTP) packet containing an MPEG media transport (MMT) message according to an embodiment of the disclosure.

FIG. 2 is a view illustrating a moving picture experts group (MPEG) media transport protocol (MMTP) packet containing an MPEG media transport (MMT) message according to an embodiment of the disclosure.

Figure 3:
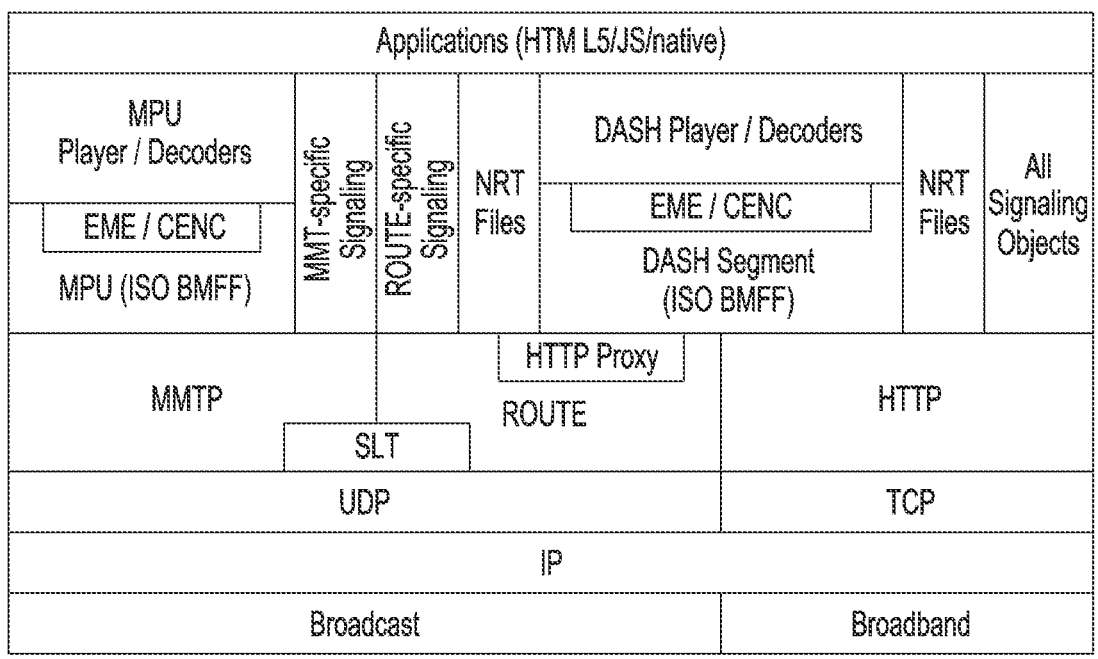
FIG. 3 is a concept view illustrating a protocol stack of a system for transmitting a broadcast service according to an embodiment of the disclosure.

FIG. 3 is a concept view illustrating a protocol stack of a system for transmitting a broadcast service according to an embodiment of the disclosure.

Figure 4:
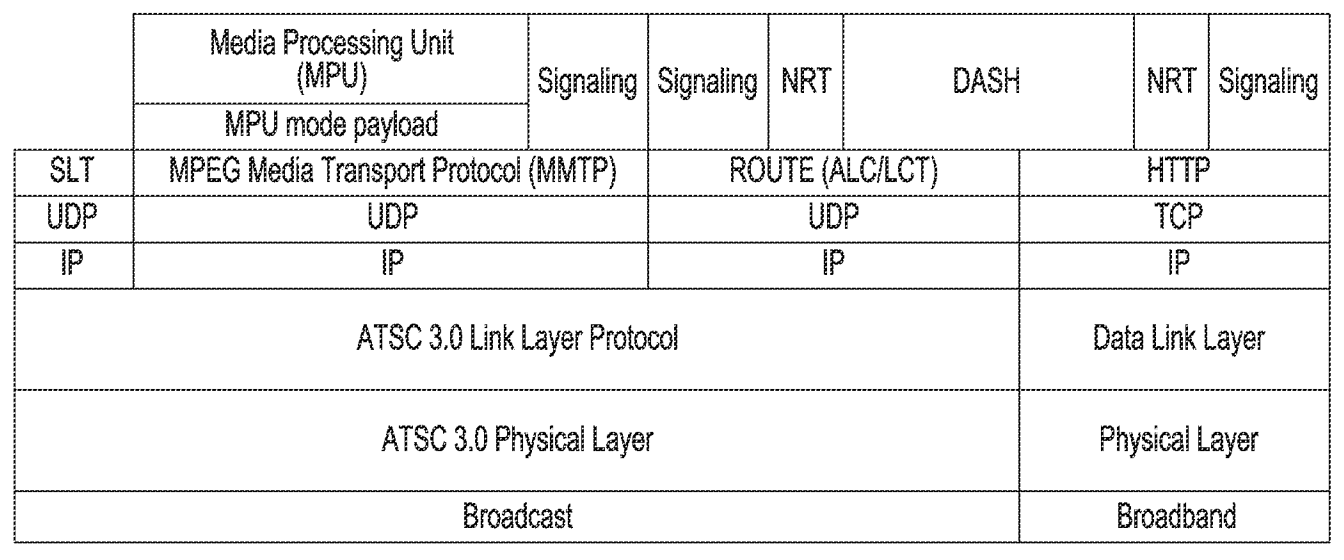

FIG. 4 is a view illustrating an advanced television systems committee (ATSC) 3.0 recipient protocol stack according to an embodiment of the disclosure.

Referring to FIGS. 1 and 2, service signaling may provide information for discovery and description of a broadcast service and may be configured of two functional elements, e.g., LLS and service layer signaling (SLS). As used herein, the term "service" may refer to a set of media components provided to the viewer. The components may be various formats of media. One service may be provided continuously or intermittently, in real-time, or in non-realtime. A real-time service may be constituted of a series of television (TV) programs.

LLS may mean a first message that is transmitted in a UDP/IP packet that is previously contained in a UDP datagram and that has a predefined IP address/port number. An LLS may be contained as an LLS table (LLS_table( )) in UDP data 103 of a UDP/IP packet and may be transmitted as shown in FIG. 1. FIG. 1 shows the architecture of the first message as including an IP header 101, a UDP header 102, and the LLS table in the UDP data 103.

SLS may mean a second message that is transmitted in an MMTP packet to provide an MMT message for discovering and obtaining a terrestrial ultra-high definition (UHD) broadcast service and the content components of the UHD broadcast service. An SLS may be contained as an MMT message in the message (MSG) payload of an MMTP packet and may be transmitted as shown in FIG. 2. The terms "MMT message" and "MMT signaling message" are interchangeably used herein. FIG. 2 shows the architecture of the second message as including an IP header 201, a UDP header 202, an MMTP header 203, an MMTP payload header for signaling mode 204, and an MMT message in the MSG payload 205.

Now described is the first message transmitted from a transmitting device to a receiving device. Here, the transmitting device may be a broadcast base station, and the receiving device may be a user device.

An LLS may be contained as an LLS table (LLS_table( )) in the UDP data 103 of a UDP/IP packet and may be transmitted as shown in FIG. 1. The UDP/IP packet for transmitting the LLS may have a pre-defined IP address and port number. The UDP data 103 of the UDP/IP packet may be the payload of the UDP/IP packet.

The UDP/IP packet may be transmitted according to a UDP/IP protocol. FIGS. 3 and 4 are views illustrating conceptual models for a system for transmitting and receiving a broadcast service. FIGS. 3 and 4 show two methods for transmitting a broadcast service.

Referring to FIGS. 3 and 4, the method corresponding to the left side of FIG. 3 is based on the MMT and transmits media processing units (MPUs) according to the MMT protocol (MMTP).

The method corresponding to the center of FIG. 3 is based on an MPEG dynamic adaptive streaming over hypertext transfer protocol (DASH)-based DASH industry forum (DASH-IF) profile. The DASH segment is transmitted via a real-time object delivery over unidirectional transport (ROUTE) protocol. Upon receipt by the receiving device, content that need not be rendered on the screen in real-time, e.g., files containing a) download application, b) continuous/non-continuous media which belong to app-based components, or c) electronic service guide (ESG) or emergency alert (EA) information, is transmitted via the ROUTE protocol.

Signaling may be transmitted via the MMT or ROUTE protocol. Bootstrap signaling information for obtaining signaling transmitted via the MMT or ROUTE protocol may be provided through a service list table (SLT).

A 'service is transmitted via broadband' means that one or more program components are transmitted via a broadband network, but not via a broadcast. In broadband, the MPEG DASH DASH-IF profile is used on the hypertext transfer protocol (HTTP)/transmission control protocol (TCP)/IP. The media file is a DASH-IF profile that is based on ISO base media file format (ISO BMFF) and this is used for media transmission, encapsulation, and sync via the broadcast network and broadband network.

The ATSC 3.0 service is provided via three functional layers, e.g., a physical layer, a delivery layer, and a service management layer as shown in FIG. 4.

The physical layer provides a mechanism in which signaling, service notifications, and IP packet streams are transmitted via the broadcast physical layer and/or broadband physical layer.

The delivery layer provides an object and object flow transport functionality. As defined in the MMTP or ROUTE protocol, it is operated in the UDP/IP multicast via the broadcast physical layer and is possible by the HTTP protocol of the TCP/IP unicast via the broadband physical layer.

The service management layer basically supports service discovery and acquisition means that allow for various types of services, e.g., linear TV and/or HTML5 application programs, to be delivered via the physical layer and delivery layer and provided and processed on the actual layer.

Now described is LLS-containing information.

The LLS may provide information necessary to obtain the basic service list configuration and the SLS for each service. In the terrestrial UHD TV broadcast system, LLS types of signaling may include, e.g., the signing configuration message (SCM), certification collection message (CCM), SLT, rating region table (RRT), System Time, common alerting protocol (CAP), version information table (VIT), and content protection table (CPT), and the LLS table may include at least one of the above types of signaling.

The LLS may contain information about the message that is signed and transmitted among the messages transmitted via the SLS and/or information for key management.

LLS-containing UDP/IP packets may be formatted in the bitstream structure as shown in Table 1 below and may be transmitted. Table 1 may represent the binary wrapper of the LLS data. The first byte of the LLS-containing UDP/IP packet may be the ID value that means the type of the table transmitted via the corresponding LLS.

TABLE 1

| Syntax | No. of Bits | Format |
|---|---|---|
| LLS_table( ) { | | |
|   LLS_table_id | 8 | uimsbf |
|   LLS_group_id | 8 | uimsbf |
|   group_count_minus1 | 8 | uimsbf |
|   LLS_table_version | 8 | uimsbf |
|   switch (LLS_table_id) { | | |
|     case 0x01: | | |
|       SLT | | var |
|       break; | | |
|     case 0x02: | | |
|       RRT | | var |
|       break; | | |
|     case 0x03: | | |
|       ... | | var |
|     case 0x20: | | |
|       SCM (Signing Configuration Message) | | var |
|       break; | | |
|     case 0x20: | | |
|       CCM (Certification Collection Message) | | var |
|       break; | | |
|     default: | | |
|       reserved | | var |
|   } | | |
| } | | |

TABLE 2

Semantics

LLS_table_id - An 8-bit unsigned integer that shall identify the type of table delivered in the body.
LLS_group_id - An 8-bit unsigned integer that shall associate this instance of LLS_table( ) with a group of Services. The value of LLS_group_id shall be unique within this broadcast stream.
group_count_minus1 - An 8-bit unsigned integer that shall indicate one less than the total number of different LLS table groups in the LLS packet stream carried in this PLP. A value 0 indicates that LLS_table( )s carrying only one value of LLS_group_id will be present, a value of 1 indicates that two are present, etc.
LLS_table_version - An 8-bit unsigned integer that shall be incremented by 1 whenever any data in the table identified by a combination of LLS_table_id and LLS_group_id changes. When the value reached 0xFF, the value shall wrap to 0x00 upon incrementing. Whenever there is more than one provider sharing a broadcast stream, the LLS_table( ) should be identified by a combination of LLS_table_id and LLS_group_id.

Table 2 above represents the semantics of the LLS table contained in the UDP/IP packet.

LLS_table_id may be an eight-bit unsigned integer for identifying the type of the table to be transferred in the body of the LLS table. LLS_group_id may indicate an eight-bit unsigned, integer able to associate the current LLS_table with the group of services. LLS_group_id may be unique in this broadcast stream. group_count_minus1 may indicate an eight-bit unsigned integer that is a one-smaller value than the total number of the LLS table groups transmitted via the current physical layer pipe (PLP). Here, LLS table group means a set of LLS_tables having the same LLS_group_id. group_count_minus1 being 0 may indicate that one LLS table group exists in the current PLP, and group_count_minus1 being 1 may indicate that the current PLP has two LLS table groups. LLS_table_version may be an eight-bit unsigned integer that increases by one whenever some data in the table identified by a combination of LLS_table_id and LLS_group_id is varied. Where LLS_table_version increases one further from its maximum value, 0xFF, its value may be set to 0x00. When there are one or more suppliers to share the broadcast stream, LLS_table( ) may be identified by a combination of LLS_table_id and LLS_group_id.

Among LLS types of signaling, the SCM is described below.

The SCM may contain information about the message, which is signed and transmitted, among the messages transmitted via the SLS, and information for verifying the signature. The information about the message which is signed and transmitted may be a list of messages that are signed and transmitted.

Specifically, the SCM may include the following configurations.

The SCM may include the default security configuration that is applied to the message, which is signed and transmitted, as described in the SCM. The SCM may include a Default_hash_algorithm that is the identifier of the default hash algorithm for calculating the hash value of the signed-and-transmitted message, a Default_key_id that is the identifier of the default key for verifying the signature of the signed-and-transmitted message, or a Default_signature_algorithm that is the identifier of the default signature algorithm for calculating the signature of the signed-and-transmitted message.

The SCM may also include the identifier of the service of the signed-and-transmitted message. The SCM may include, per service, the identifier of the signed-and-transmitted message, the default security configuration of the signed-and-transmitted message, or the security configuration of the signed-and-transmitted message.

The security configuration of the signed-and-transmitted message may include a hash algorithm, a key id, or a signature algorithm. The hash algorithm may be included when the default hash algorithm is varied. The key id may be included when the default key is varied. The signature algorithm may be included when the default signature algorithm is varied.

The identifier of the signed-and-transmitted message, in the case of the ROUTE protocol, may be a binary code (e.g., 1:USBD, 2:S-TSID, etc.) or a string of characters (e.g., USBD or S-TSID). The identifier of the signed-and-transmitted message, in the case of the MMT protocol, may be at least one of packet_id, message_id, or atsc3_message_content_type (when message_id=0x8100).

The SCM may also include the identifier, LLS_group_id, of the LLS table group. Several broadcasters may share one frequency in which case LLS signaling may be provided for each of the different broadcasters at the frequency. In this case, the LLS table group may mean the group of LLS tables that one broadcaster provides. The SCM may include information indicating what information is protected per LLS table group and transmitted. The SCM may include, per LLS_group_id, the default security configuration applied to the LLS table of the corresponding LLS table group, the identifier of the LLS table, or the security configuration.

According to an embodiment, the SCM may only carry the information about the signed LLS table, with the information about each service provided via the sub-element of the service element in the SLT. The SLT may be a table that contains signaling information used to provide the bootstrap for obtaining the service layer signaling and the default service list configuration.

Among the LLS types of signaling, the CCM is described below.

The CCM may contain at least one certificate. Each certificate may contain a current verification key.

According to an embodiment, the CCM may further include security configuration information (e.g., hash algorithm, key id, or signature algorithm) applied to the signature that may be verified using the certificate.

The SLS may provide information for the receiving device to receive and use the components of each service, per service. The SLS may be signaling for providing information for discovering and obtaining a terrestrial UHD broadcast service and the content components of the service.

The SLS may be transmitted as a message of various formats depending on the information contained in the SLS. Where the service involves transmitting content in MPUs via the MMTP, the SLS may transmit the MMT signaling message on the MMTP/UDP/IP. The SLS may be contained and transmitted in the payload of the MMTP packet as shown in FIG. 2. FIG. 2 shows the architecture of the second message.

Timing information and/or security configuration information about each signature may be transmitted along with the signature.

Where an object-based transport protocol, such as the ROUTE protocol, is used, text (XML) signaling may be delivered to the object or object package via the secure MIME (S/MIME). Where the package of objects is used, each hash of the text document (XML document) may be signed and attached with the text document (XML document), or the hashes of all the text documents (XML documents) in the package may simultaneously be signed and delivered by the S/MIME wrapper.

Where a real-time streaming protocol, e.g., MMT, is used, the text data (XML) or binary signaling may be encapsulated into a binary wrapper. Table 3 may represent a binary wrapper of the first format of the SLS message.

TABLE 3

| Syntax | No. of Bits | Format |
|---|---|---|
| mmt_atsc3_message( ) { | | |
|   message_id | 16 | uimsbf |
|   version | 8 | uimsbf |
|   length | 32 | uimsbf |
|   message payload { | | |
|     service_id | 16 | uimsbf |
|     atsc3_message_content_type | 16 | uimbsf |
|     atsc3_message_content_version | 8 | uimbsf |
|     atsc3_message_content_compression | 8 | uimbsf |
|     authentication_data_present | 1 | bslbf |
|     reserved | 7 | '000 0000' |
|     URI_length | 8 | uimbsf |
|     for (i=0;i< URI_length;i++) { | | |
|       URI_byte | 8 | uimsbf |
|     } | | |
|     atsc3_message_content_length | 32 | uimsbf |
|     for (i=0;i<atsc3_message_content_length;i++) { | | |
|       atsc3_message_content_byte | 8 | uimsbf |
|     } | | |
|     if (authentication_data_present) authentication_data( ) | | |
|     reserved | var | uimsbf |
|   } | | |
| } | | |

Tables 4 and 5 represent the semantics of mmt_atsc3_message.

TABLE 4 message_id - A 16-bit unsigned integer field that shall uniquely identify the mmt_atsc3_message( ). The value of this field shall be 0x8100.
version - An 8-bit unsigned integer field that shall be incremented by 1 any time there is a change in the information carried in this message. When the version field reaches its maximum value of 255, its value shall wraparound to 0.
length - A 32-bit unsigned integer field that shall provide the length of mmt_atsc3_message( ) in bytes, counting from the beginning of the next field to the last byte of the mmt_atsc3_message( ).
service_id - A 16-bit unsigned integer field that shall associate the message payload with the service identified in the serviceId attribute given in the SLT.
atsc3_message_content_type - A 16-bit unsigned integer field that shall uniquely identify the type of message content in the mmt_atsc3_message( ) payload, coded per Table 7.6 below.

TABLE 5

Code Values for atsc3_message_content_type

| atsc3_message_content_type | Meaning |
|---|---|
| 0x0000 | ATSC Reserved |
| 0x0001 | UserServiceDescription as given in Table 7.4. |
| 0x0002 | MPD as given in DASH-IF [12]. |
| 0x0003 | HELD as given in A/337, Application Signaling [7]. |
| 0x0004 | Application Event Information as given in A/337, Application Signaling [7]. |
| 0x0005 | Video Stream Properties Descriptor (Sec. 7.2.3.2) |
| 0x0006 | ATSC Staggercast Descriptor (Sec. 7.2.3.3) |
| 0x0007 | Inband Event Descriptor as given in A/337, Application Signaling [7]. |

TABLE 5-continued

Code Values for atsc3_message_content_type

| atsc3_message_content_type | Meaning |
|---|---|
| 0x0008 | Caption Asset Descriptor (Sec. 7.2.3.5) |
| 0x0009 | Audio Stream Properties Descriptor (Sec. 7.2.3.4) |
| 0x000A | DWD as given in A/337, Application Signaling [7]. |
| 0x000B~0xFFFF | ATSC Reserved | atsc3_message_content_version—An 8-bit unsigned integer field that shall be incremented by 1 any time there is a change in the mmt_atsc3_message content identified by a service_id, and atsc_message_content_type pair and URI if present. When the atsc3_message_sontent_version field reaches its maximum value, its value shall wrap around to 0.

atsc3_message_content_compression—An 8-bit unsigned integer field that shall identify the type of compression applied to the data in atsc3_message_content_byte.

Code Values for atsc3_message_content_compression

| asc3_message_content_compression | Meaning |
|---|---|
| 0x00 | ATSC Reserved |
| 0x01 | No compression has been applied |
| 0x02 | gzip specified in RFC 1952 [16] has been applied |
| 0x03 | The template-based compression scheme as specified Annex D has been applied |
| 0x04~0xFF | ATSC Reserved |

URI_length—An 8-bit unsigned integer field that shall provide the length of the URI uniquely identifying the message payload across services. If the URI is not present, the value of this field shall be set to 0. When this mmt_atsc3_message( ) carries an MPD (i.e. atsc3_message_content_type=0x0002), the URI silk, be present.

URI_Byte—An 8-bit unsigned integer field that shall contain a UTF-8 character of the URI associated with the content carried by this message excluding the terminating null character, as per RFC 3986 [19]. This field when present shall be used to identify delivered message payloads. The URI can be used by system tables to reference tables made available by delivered message payloads.

atsc3_message_content_length—A 32-bit unsigned integer field that shall provide the length of the content carried by this message.

atsc3_message_content_byte—An 8-bit unsigned integer field that shall contain a byte of the content carried by this message.

authentication_data_present—This 1-bit Boolean flag shall indicate, when set to that the elements in the authentication_data( ) structure are present. When set to '0', the flag shall indicate that the elements in the authentication_data ( ) structure are not present.

mmt_atsc3_message( ) may include the following components. mmt_atsc3_message( ) may include message_id that is a 16-bit unsigned integer field for uniquely identifying mmt_atsc3_message( ) mmt_atsc3_message( ) may include version, an eight-bit unsigned integer field that increases by one whenever the information delivered in mmt_atsc3_message( ) is varied. When the version field reaches the maximum value, 255, the value may turn back to 0. mmt_atsc3_message( ) may include length, a 32-bit unsigned integer field that provides its length in bytes. The length field may be counted from the beginning of the next field to the last byte of mmt_atsc3_message( ) mmt_atsc3_message( ) may include service_id, a 16-bit unsigned integer field for associating the payload of mmt_atsc3_message( ) with the service identified from the serviceId attribute contained in the SLT. mmt_atsc3_message( ) may include atsc3_message_content_type, a 16-bit unsigned integer field for uniquely identifying the message content type of the payload of mmt_atsc3_message( ). mmt_atsc3_message( ) may include atsc3_message_content_version, an eight-bit unsigned integer field, that increases by one whenever the content of mmt_atsc3_message identified by service_id, atsc3_message_content_type, and if any, the URI is varied. When the atsc3_message_content_version field reaches the maximum value, its value may be varied (wrapped around) to 0. mmt_atsc3_message( ) may include atsc3_message_content_compression, an eight-bit unsigned integer field for identifying the type of compression applied to the data in atsc3_message_content_byte. mmt_atsc3_message( ) may include authentication_data_present in which its one-bit boolean flag being set to 1 indicates that the authentication_data( ) structure has elements and the one-bit boolean flag being set to 0 indicates that the authentication_data( ) structure has no element. In other words, authentication_data_present may indicate whether the information contained in mmt_atsc3_message has been signed. mmt_atsc3_message( ) may include URI_length, an eight-bit unsigned integer field for providing the length of the URI that uniquely identifies the message payload over the entire service. When there is no URI, the URI_length field may be set to 0. mmt_atsc3_message( ) may include URI_byte, an eight-bit unsigned integer field containing a UTF-8 character of the URI related to the content carried by the message except for the termination null character. mmt_atsc3_message( ) may include atsc3_message_content_length, a 32-bit unsigned integer field for providing the length of the content carried by mmt_atsc3_message. mmt_atsc3_message( ) may include atsc3_message_content_byte, an eight-bit unsigned integer field containing the number of bytes of the content carried by mmt_atsc3_message.

Table 6 represents the structure of authentication_data that may be contained in mmt_atsc3_message, where authentication_data_present indicates that the information contained in mmt_atsc3_message has been signed.

TABLE 6

| Syntax | No. of Bits | Format |
|---|---|---|
| authentication data( ) { | | |
|   content_hash_algorithm_identifier //optional | 8 | uimsbf |
|   content_hash_length | 8 | uimbsf |
|   for (i=0;i< content_has_length;i++) { | | |
|     content_hash_byte | 8 | uimsbf |
|   } | | |
|   signature_algorithm_identifier //optional | 8 | uimsbf |
|   signature_key_identifier_length | 8 | uimbsf |
|   for (i=0;1< signature_key_identifier_length;i++) { | | |
|     signature_key_identifier_byte | 8 | uimsbf |
|   } | | |
|   extension_length | 8 | uimbsf |
|   for (i=0;i< extension_length;i++) { | | |
|     extension_byte | 8 | uimsbf |

TABLE 6-continued

| Syntax | No. of Bits | Format |
|---|---|---|
| }<br>  for (i=0;i< N;i++) { //N is determined by the signature algorithm | | |
|     signature_byte | 8 | uimsbf |
|   }<br>} | | |

Table 7 represents the semantics of authentication_data( ).

TABLE 7

| authentication_data( ) |
|---|
| content_hash_algorithm_identifier - An 8-bit unsigned integer field that shall uniquely identify the hash algorithm used to create the hash of atsc3_message_content( ) that is contained in the content_hash field.<br>content_hash_length - An 8-bit unsigned integer field that shall indicate the number of bytes of hash data present in content_hash field. Its value shall not be greater than the length of the hash produced by the hash algorithm indicated by content_hash_algorithm_identifier field and shall not be less than 8. Its value may be smaller than the length of the hash produced by the hash algorithm, in which case the content hash is truncated from the full length hash produced by the hash algorithm.<br>content_hash_byte - An 8-bit unsigned integer field that shall contain a byte of the content hash, which conveys a cryptographic hash of the atsc3_message_content, calculated using the hash algorithm indicated in the content_hash_algorithm_identifier field and truncated to content_hash_length.<br>signature_algorithm_identifier - An 8-bit unsigned integer field that shall uniquely identify the algorithm used to calculate the signature of the authentication_data( ), which is conveyed in the signature field.<br>signature_key_identifier_length - An 8-bit unsigned integer field that shall indicate the number of bytes of the following signature_key_identifier field..<br>signature_key_identifier_byte - An 8-bit unsigned integer field that shall contain a byte of a truncated identifier for the public key needed to verify the signature contained in the signature field. This field shall match the truncated identifier of a public key delivered by the trust management mechanism.<br>signature_byte - An 8-bit unsigned integer field that shall contain a byte of the signature, which conveys a digital signature calculated using the algorithm specified in the signature_algorithm_identifier field. The input data for the signature algorithm shall be the entire authentication_data( ) up to, but not including the first signature_byte. The total number of signature bytes present is determined by the signature algorithm and key being used.<br>  In another embodiment, the input for the signature algorithm can be the entire mmt_atsc3_message( ) excluding signature_byte | authentication_data( ) may include the following fields. authentication_data( ) may include content_hash_algorithm_identifier, an eight-bit unsigned integer field for uniquely identifying the hash algorithm used to produce the hash of atsc3_message_content( ) contained in the content_hash field. authentication_data( ) may include content_hash_length, an eight-bit unsigned integer field to indicate the number of bytes of the hash data present in the content_hash field. The value of content_hash_length may not be smaller than eight and larger than the length of the hash produced by the hash algorithm indicated by the content_hash_algorithm_identifier field. Where the content hash is omitted from the entire length of hash produced by the hash algorithm, the value of content_hash_length may be smaller than the length of the hash produced by the hash algorithm. authentication_data( ) may include content_hash_byte, an eight-bit unsigned integer field containing the number of bytes of the content hash delivering the encrypted hash of atsc3_message_content, which is calculated by the hash algorithm indicated by the content_hash_algorithm_identifier field and which is omitted by content_hash_length. authentication_data( ) may include signature_algorithm_identifier, an eight-bit unsigned integer field for uniquely identifying the algorithm used to calculate the signature of authentication_data( ) which is delivered in the signature field. authentication_data( ) may include signature_key_identifier_length, an eight-bit unsigned integer field indicating the number of bytes of the next coming signature_key_identifier field. The signature_key_identifier field means as many subsequent signature_key_identifier bytes as signature_key_identifier_length. In this case, the value of the signature_key_identifier_length field may be equal or smaller than the entire length of the actual public key. authentication_data( ) may include signature_key_identifier_byte, an eight-bit unsigned integer field containing the number of bytes of the cut-off identifier for the public key necessary to identify the signature contained in the signature field. signature_key_identifier, constituted of the signature_key_identifier_byte fields should match the cut-off identifier of the public key delivered by the reliability management mechanism. authentication_data( ) may include signature_byte, an eight-bit unsigned integer field containing the number of bytes of the signature for delivering the digital signature calculated using the algorithm designated in the signature_algorithm_identifier field. The input data for the signature algorithm may be the entire authentication_data( ) except for the signature_bytes. The total number of the signature_bytes may be determined by the key being used and the signature algorithm.

According to an embodiment, an input for the signature algorithm may be the entire mmt_atsc3_message( ) except for signature_byte.

In a real-time streaming protocol, e.g., MMT, binary signaling may be encapsulated by the signature-containing binary wrapper. Table 8 may represent the binary wrapper of the second format of the SLS.

TABLE 8

| Syntax | No. of Bits | Format |
|---|---|---|
| mmt_signed_message( ) { | | |
|   message_id | 16 | uimsbf |

TABLE 8-continued

| Syntax | No. of Bits | Format |
|---|---|---|
| version | 8 | uimsbf |
| length | 32 | uimsbf |
| message payload { | | |
| message( ) | 16 | uimsbf |
| authentication_data( ) | | |
| reserved | var | uimsbf |
| } | | |
| } | | | mmt_signed_message( ) being transmitted means that the information contained in mmt_signed_message( ) has been signed. The receiving device may be aware that the information contained in mmt_signed_message( ) has been signed by receiving mmt_signed_message( ). In other words, mmt_signed_message( ) itself may indicate whether the information contained in mmt_signed_message( ) has been signed.

In Table 8, message_id may be a 16-bit unsigned integer field for uniquely identifying mmt_signed_message( ). In Table 8, message( ) may be an MMT signaling message.

Table 9 represents an example of the MMT signaling message.

TABLE 9

Five types of signalling messages are defined for the consumption of Packages;

Package Access (PA) message: This message type contains a Package Access (PA) table that has information on all signalling tables required for Package access, including MMT Package (MP) table and MPI table (see sub-clause 9.3.2);
Meta Presentation Information (MPI) message: This message type contains MPI table encapsulating a whole or a subset of a presentation information document. It may also include an MP table corresponding to the MPI table for fast Package consumption (see sub-clause 9.3.3);
MMT Package Table (MPT) message: This message type contains an MP table that provides all or a part of information required for a single Package consumption (see sub-clause 9.3.4);
Clock Relation Information (CRI) message: This message type contains a CRI table that provides clock related information used for the mapping between an NTP timestamp and MPEG-2 System Time Clock (see sub-clause 9.3.5);
Device Capability Information (DCI) message: This message type contains a DCI table that provides the required device capability information for Package consumption (see sub-clause 9.3.6);
One types of signalling messages are defined for the delivery of MMT Packages:
Hypothetical Receiver Buffer Model(HRBM) message: This message type is used to provide information to configure Hypothetical Receiver Buffer Model (HRBM) operation (see sub-clause 9.4.2), the HRBM is specified in clause 10;

Table 10 represents the structure of authentication_data( ) contained in mmt_signed_message( ).

TABLE 10

| Syntax | No. of Bits | Format |
|---|---|---|
| authentication_data( ) { | | |
| content_hash_algorithm_identifier //optional | 8 | uimsbf |
| content_hash_length | 8 | uimbsf |
| for (i=0;i< content_has_length;i++) { | | |
| content_hash_byte | 8 | uimsbf |
| } | | |
| signature_algorithm_identifier //optional | 8 | uimsbf |
| signature_key_identifier_length | 8 | uimbsf |
| for (i=0;i< signature_key_identifier_length;i++) { | | |
| signature_key_identifier_byte | 8 | uimsbf |
| } | | |
| extension_length | 8 | uimbsf |
| for (i=0;i< extension_length;i++) { | | |
| extension_byte | 8 | uimsbf |

TABLE 10-continued

| Syntax | No. of Bits | Format |
|---|---|---|
| } | | |
| for (i=0;i< N;i++) { //N is determined by the signature algorithm | | |
| signature_byte | 8 | uimsbf |
| } | | |
| } | | |

The semantics of Table 10 may be the same as the semantics of Table 7.

A method for providing a broadcast service and a method for receiving a broadcast service are described below with reference to FIGS. 5 to 8.

Figure 5:
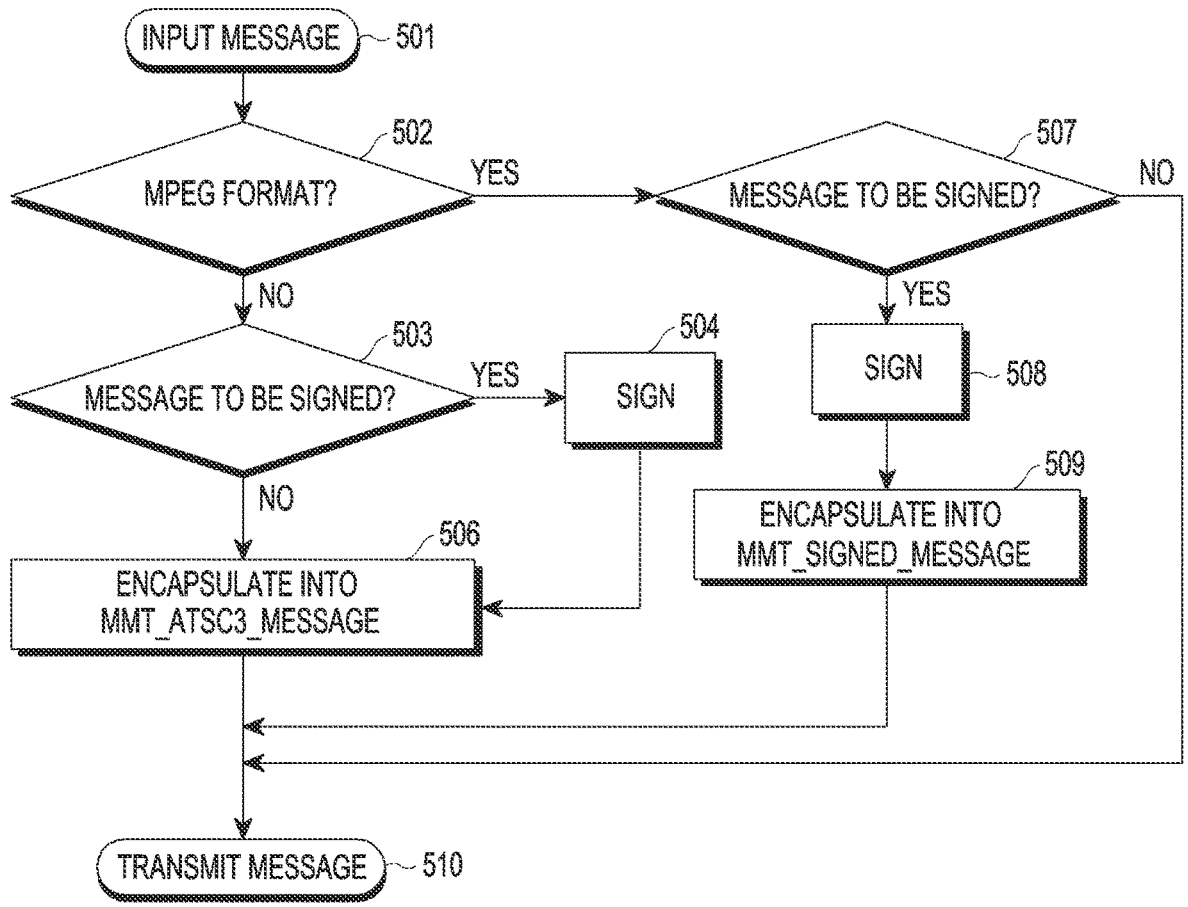
FIG. 5 is a flowchart illustrating a method in which a transmitting device provides a message for a broadcast service to a receiving device according to an embodiment of the disclosure.

FIG. 5 is a flowchart illustrating a method in which a transmitting device provides a message for a broadcast service to a receiving device according to an embodiment of the disclosure.

Figure 6:
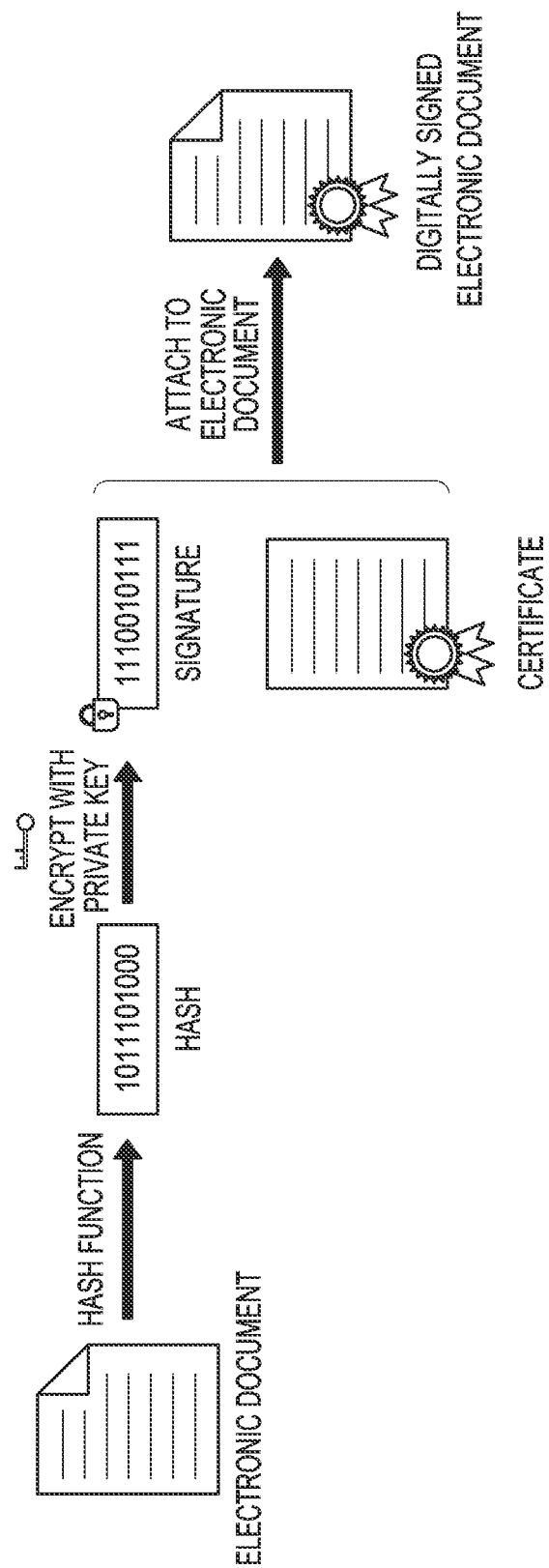
FIG. 6 is a view schematically illustrating a process for digital signature according to an embodiment of the disclosure.

FIG. 6 is a view schematically illustrating a process for digital signature according to an embodiment of the disclosure.

Figure 7:
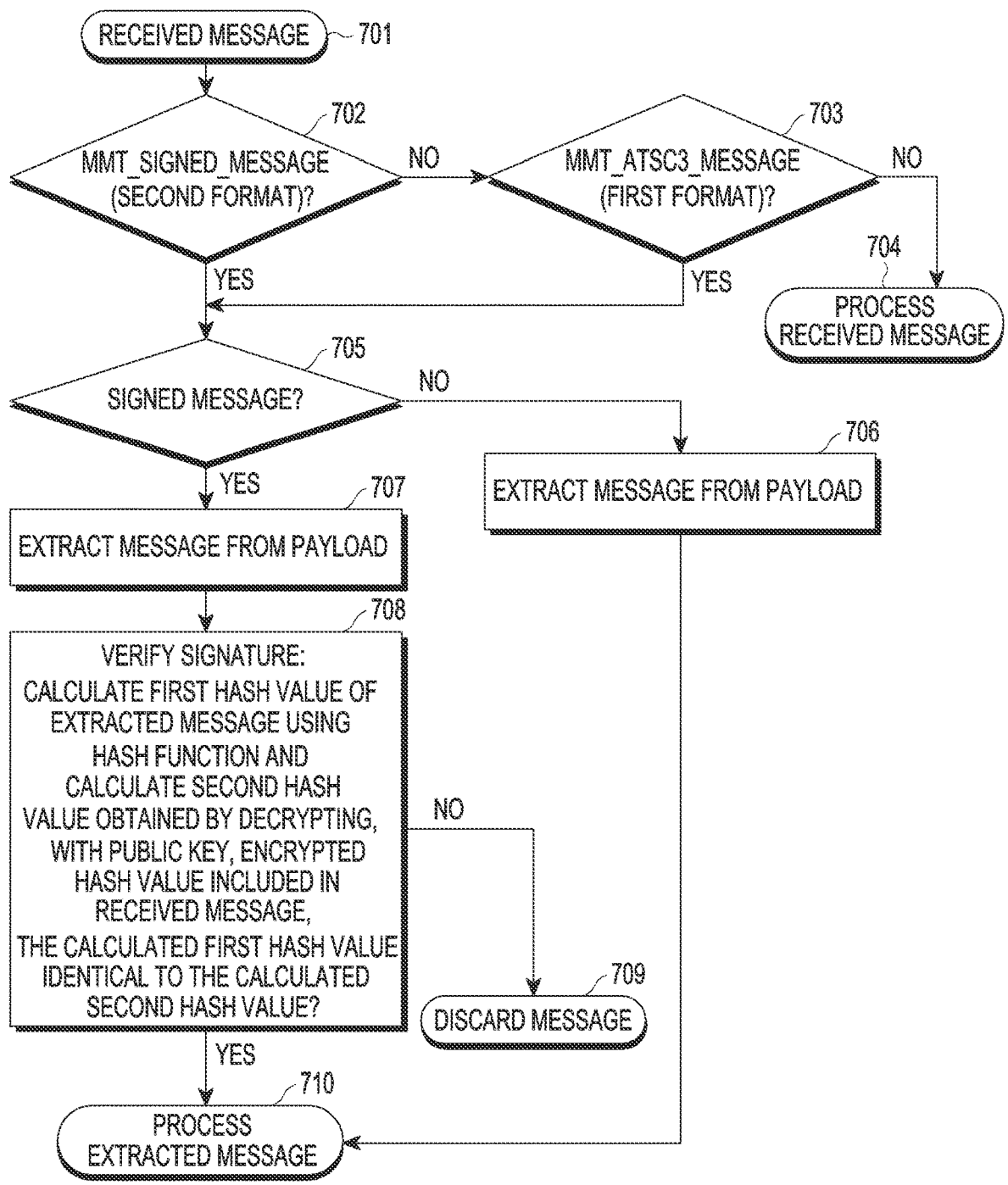
FIG. 7 is a flowchart illustrating a method in which a receiving device receives a message for a broadcast service from a transmitting device according to an embodiment of the disclosure.

FIG. 7 is a flowchart illustrating a method in which a receiving device receives a message for a broadcast service from a transmitting device according to an embodiment of the disclosure.

Figure 8:
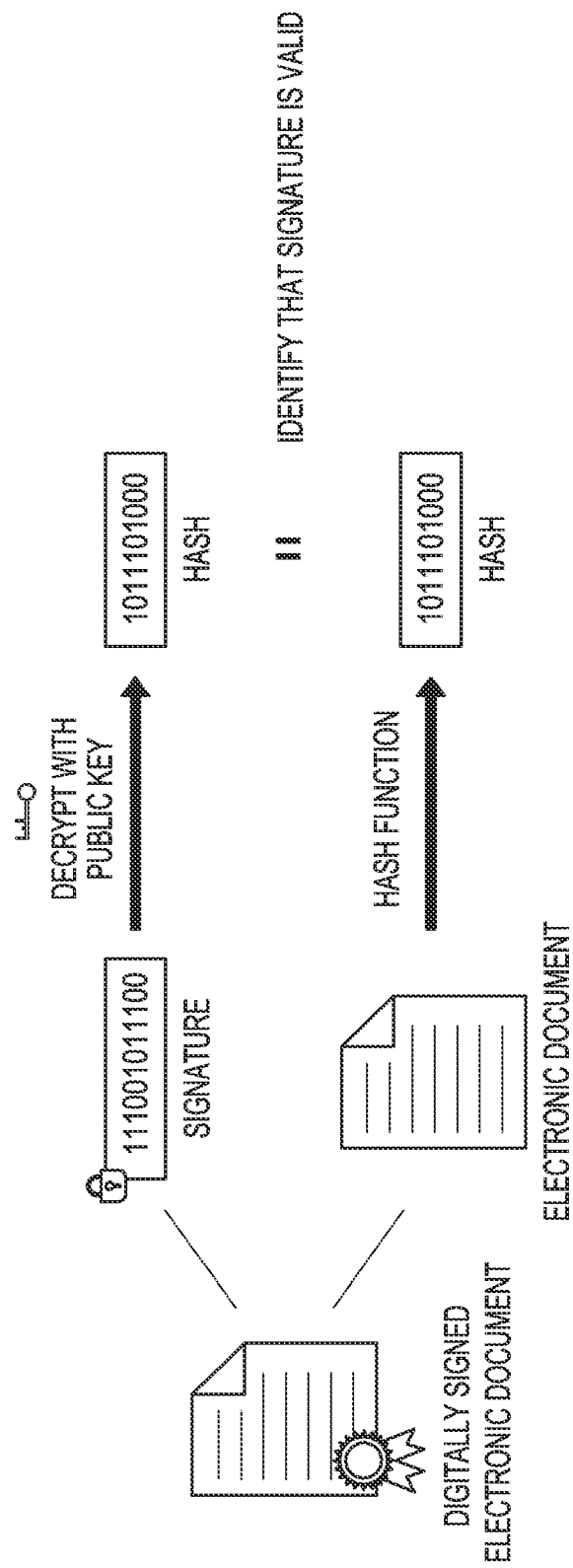
FIG. 8 is a view schematically illustrating a process for verifying a document according to an embodiment of the disclosure.

FIG. 8 is a view schematically illustrating a process for verifying a document according to an embodiment of the disclosure.

At first, a method for providing messages for a broadcast service from a transmitting device to a receiving device is described with reference to FIG. 5.

Referring to FIG. 5, the transmitting device may identify an input message, at operation 501. Here, the input message may be information—e.g., the above-described HELD, MPD, or MMT signaling message—for the receiving device to receive and use the components of each service.

The transmitting device may identify the format of the input message, at operation 502. The transmitting device may identify whether the input message is the MPEG format corresponding to, e.g., the PA table or MP table, as exemplified as information corresponding to the MMT signaling message of Table 9. The transmitting device may identify whether the input message corresponds to, e.g., HELD or MPD, as exemplified as information contained in atsc3_message_content_type of Table 4. The input message may be encapsulated into mmt_atsc3_message( ) which is the first format, when the input message is identified as the information contained in atsc3_message_content_type, or the input message may be encapsulated into mmt_signed_message( ) which is the second format, when the input message is identified as the information corresponding to the MMT signaling message.

In this case, the transmitting device may identify whether the input message is a message to be signed, at operation 503 or operation 507. That is, the transmitting device may identify whether to sign and transmit the input message. Upon identifying that the input message is a message to be signed, the input message may be signed, at operation 504 or operation 508, before being encapsulated into mmt_atsc3_message( ) or mmt_signed_message( ) at operation 506 or operation 509. The transmitting device may determine a certificate to be used for signature. The transmitting device may form a signature by calculating the hash value of the input message using a hash function. The transmitting device may form a LLS message containing the certificate and/or the hash function used for the signature.

The transmitting device may transmit the message encapsulated in the first or second format to the receiving device, at operation 510. The message encapsulated in the first or second format may be the second message. The signature formed in the second message may be attached and transmitted. Or, a separate dedicated-authentication message containing the certificate may be formed and transmitted. The transmitting device may transmit the first message to the receiving device before transmitting the second message. The first message may be a message containing the LLS table.

Although an example of a method for providing messages for a broadcast service from a transmitting device to a receiving device has been described above with reference to FIG. 5, the operations of FIG. 5 are not limited as performed in the order shown therein and may rather be carried out in a different order. Further, some of the operations may be omitted according to an embodiment. Also, some of the operations may be integrated and performed in a single operation.

Here, the signature may be a digital signature that may be electronic information attached or logically combined with the corresponding electronic document, as used for identifying the sender (signer) in the public key system and for proving the identity by indicating that the sender has signed the corresponding electronic document. Or, the signature may be transmitted separately as a dedicated message. The recipient may decrypt the electronic document, which has been encrypted with the sender's private key, using the sender's public key. The recipient subscribing to the service may have the sender's public key.

The digital signature may consist of three algorithms. The three algorithms may be a key generation algorithm for generating a pair of public keys, an algorithm for generating the signature using the sender's private key, and an algorithm for verifying the signature using the sender's public key.

Referring to FIG. 6, signing may include calculating the hash value for the electronic document using the hash function and encrypting the hash value with the sender's private key to thereby forming the signature. The signature may be attached or logically combined with the corresponding document and may then be transmitted. At this time, the certificate may be transmitted along with the corresponding electronic document.

Now described is a method for receiving, by a receiving device, messages for a broadcast service from a transmitting device.

Referring to FIG. 7, the receiving device may identify a received message, at operation 701. The received message may be the first or second message that the transmitting device has sent to the receiving device.

The receiving device may identify the format of the received message. The receiving device may identify whether the received message is the mmt_signed_message ( ) format which is the second-format message, at operation 702 or the mmt_atsc3_message( ) format which is the first-format message, at operation 703. Although FIG. 7 illustrates an example in which the receiving device identifies whether it is the second format and then identifies whether it is the first format, the order may be varied or whether it is the first format or the second format may be determined at the same time.

Where the received message is neither the first format nor the second format, the receiving device may process the received message, at operation 704.

Where the received message is the first or second format, the receiving device may identify whether the received message is a signed message, at operation 705. Unless the received message is a signed message, the receiving device may extract a message from the payload of the received message and process the extracted message, at operation 706.

When the received message is a signed message, the receiving device may store it in the buffer. When the received message is a signed message, the receiving device may extract a message from the payload of the received message, at operation 707, and may verify the signature, at operation 708.

Referring to FIG. 8, verifying the document may include calculating the hash value for the data of the received document using the hash function, comparing the signature of the received document with the hash value decrypted using the sender's public key, and if the two values are the same, identifying that the signature is valid.

Referring back to FIG. 7, the receiving device may calculate a first hash value which is the hash value of the message extracted using the hash function, at operation 708. The hash function may be contained in the received message or in the LLS message received by the receiving device before or after the received message. The hash function may be the same as the hash function that the transmitting device has used to calculate the hash value of the received message. The receiving device may receive and process the LLS message to obtain the certificate and to identify the signed message.

The receiving device may also calculate a second hash value that is obtained by decrypting the encrypted hash value attached to the received message with the public key, at operation 708. Here, the encrypted hash value may mean the signature of the received message. The public key may also be referred to as a verification key. The receiving device may receive the certificate having the public key. The receiving device may receive the public key and/or the certificate via the LLS message.

The receiving device may identify whether the first hash value matches the second hash value, at operation 708. The receiving device may determine that the signature is correct when the first hash value is the same as the second hash value and that the signature is wrong when the first hash value differs from the second hash value or the conversion has an error. When the signature is wrong, the receiving device may determine that a variation or error has occurred during the reception and discard the received message without processing, at operation 709. Upon determining that the signature is correct, the receiving device may process the message, at operation 710.

Although an example of a method for receiving, by a receiving device, messages for a broadcast service from a transmitting device has been described above in connection with FIG. 7, the operations of FIG. 7 are not limited as performed in the order shown therein and may rather be carried out in a different order. Some of the operations may be omitted according to an embodiment. Some of the operations may be integrated and performed in a single operation.

In determining whether the received message is a signed message, the receiving device may use the LLS message previously received. The LLS message may contain information about the signed-and-transmitted message. The receiving device may previously be aware of the signed-and-transmitted message through the information contained in the received LLS message. Thus, the receiving device may be aware whether a subsequently received message is a signed message even without processing the received message. This may enhance the message processing rate and reduce unnecessary resource waste. One service may simultaneously provide real-time streaming content and files related to ever real-time streaming content. In this case, the system providing the service may separately operate a transport protocol for real-time streaming and a transport protocol for file transfer. At this time, although the processes for processing the signature may differ a little bit depending on the transport protocols, it may be preferable in terms of transport efficiency to transfer the common information for the same via a LLS message, rather than their respective transport protocols.

Figure 9:
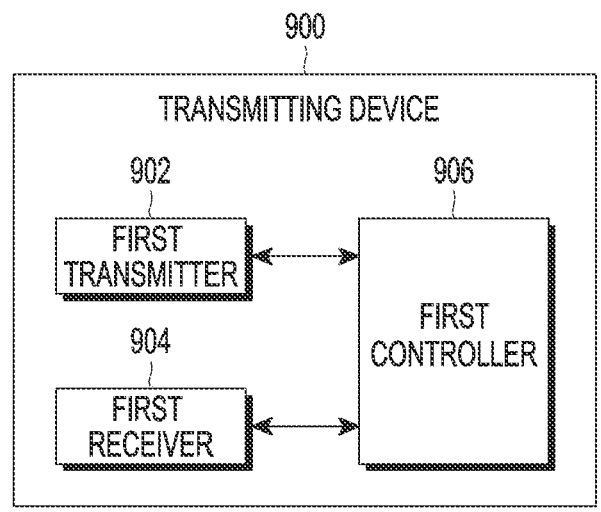
FIG. 9 is a block diagram illustrating an internal configuration of a transmitting device providing a broadcast service according to an embodiment of the disclosure.

FIG. 9 is a block diagram illustrating an internal configuration of a transmitting device providing a broadcast service according to an embodiment of the disclosure.

Referring to FIG. 9, a transmitting device 900 includes a first transmitter 902, a first receiver 904, and a first controller 906. The transmitting device 900 may be a broadcast base station.

The first controller 906 (e.g., at least one processor) controls the overall operation of the transmitting device 900. In particular, the first controller 906 performs control to fulfill the overall operation related to the transmission of the first message and the second message according to an embodiment. Here, the overall operation related to the transmission of the first message and the second message is the same as those described above in connection with FIGS. 1 to 5, and thus, no detailed description thereof is given.

The first transmitter 902 transmits various messages under the control of the first controller 906. Here, the various messages transmitted from the first transmitter 902 are the same as those described above in connection with FIGS. 1 to 5, and thus, no detailed description thereof is given.

The first receiver 904 receives various messages under the control of the first controller 906. Here, the various messages received by the first receiver 904 are the same as those described above in connection with FIGS. 1 to 5, and thus, no detailed description thereof is given.

Figure 10:
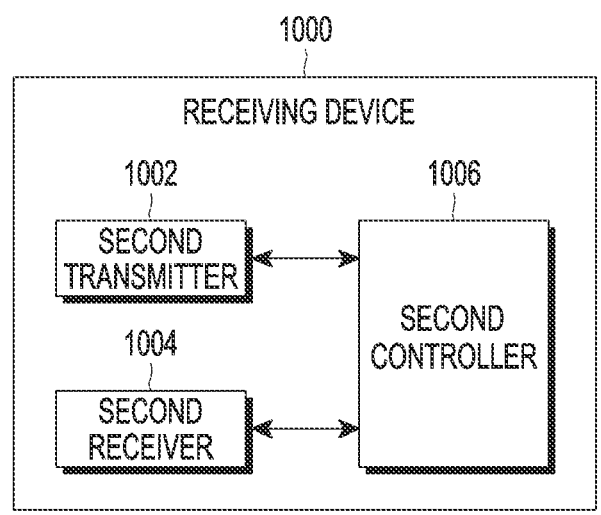
FIG. 10 is a block diagram illustrating an internal configuration of a receiving device receiving a broadcast service according to an embodiment of the disclosure.

FIG. 10 is a block diagram illustrating an internal configuration of a receiving device receiving a broadcast service according to an embodiment of the disclosure.

Referring to FIG. 10, a receiving device 1000 includes a second transmitter 1002, a second receiver 1004, and a second controller 1006.

The second controller 1006 (e.g., at least one processor) controls the overall operation of the receiving device 1000. In particular, the second controller 1006 performs control to fulfill the overall operation related to the reception of the first message and the second message according to an embodiment of the disclosure. Here, the overall operation related to the reception of the first message and the second message is the same as those described above in connection with FIGS. 1 to 4 and 6, and thus, no detailed description thereof is given.

The second transmitter 1002 transmits various messages under the control of the second controller 1006. Here, the various messages transmitted from the second transmitter 1002 are the same as those described above in connection with FIGS. 1 to 4 and 6, and thus, no detailed description thereof is given.

The second receiver 1004 receives various messages under the control of the second controller 1006. Here, the various messages received by the second receiver 1004 are the same as those described above in connection with FIGS. 1 to 4 and 6, and thus, no detailed description thereof is given.

Particular aspects of the disclosure may be implemented as computer readable codes in a computer readable recording medium. The computer readable recording medium is a data storage device that may store data readable by a computer system. Examples of the computer readable recording medium may include read only memories (ROMs), random access memories (RAMs), compact disc (CD)-ROMs, magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain various embodiments of the disclosure may be readily interpreted by skilled programmers in the art to which the disclosure pertains.

The apparatuses and methods according to embodiments of the disclosure may be implemented in hardware, software, or a combination of hardware and software. Such software may be stored in a volatile or non-volatile storage device such as a ROM or other storage devices, a memory, such as a RAM, a memory chip, a device or an integrated circuit, or a storage medium, such as, e.g., a CD, a digital video disc (DVD), a magnetic disk, or a magnetic tape, which allows for optical or magnetic recording while simultaneously read out by a machine (e.g., a computer). The methods according to embodiments of the disclosure may be implemented by a computer or a portable terminal including a controller and a memory, and the memory may be a machine-readable storage medium that may properly retain program(s) containing instructions for implementing the embodiments of the disclosure.

Accordingly, the disclosure encompasses a program containing codes for implementing the device or method set forth in the claims of this disclosure and a machine (e.g., computer)—readable storage medium storing the program. The program may be electronically transferred via any media such as communication signals transmitted through a wired or wireless connection and the disclosure properly includes the equivalents thereof.

The apparatuses according to embodiments of the disclosure may receive the program from a program providing device wiredly or wirelessly connected thereto and store the same. The program providing apparatus may include a memory for storing a program including instructions enabling a program processing apparatus to perform a method according to an embodiment and data necessary for a method according to an embodiment, a communication unit for performing wired or wireless communication with a graphic processing apparatus, and a controller transmitting the program to the graphic processing apparatus automatically or as requested by the graphic processing apparatus.

Another embodiment of the disclosure is described below.

The SLS may provide information for the receiving device to receive and use the components of each service, per service. At this time, each SLS message may be signed and transmitted, or a plurality of SLS messages may simultaneously be signed and transmitted. In this case, security configuration information and/or timing information for the signature of the plurality of SLS messages may simultaneously be transmitted in a single message in the form of a loop.

Table 11 represents mmt_authentication_message( ) containing the information about the signature of the plurality of SLS messages. mmt_authentication_message( ) may be contained and transmitted in mmt_atsc3_message or mmt_signed_message. Or, mmt_authentication_message( ) may be transmitted separately from mmt_atsc3_message and mmt_signed_message.

TABLE 11

| Syntax | No. of Bits | Format |
| --- | --- | --- |
| mmt_authentication_message( ) { | | |
|   message_id | 16 | uimsbf |
|   version | 8 | uimsbf |
|   length | 32 | uimsbf |
|   message payload { | | |
|     authentication_group_id | 8 | uimsbf |
|     message_hash_algorithm_identifier | 8 | uimbsf |
|     message_hash_length | 8 | uimbsf |
|     signature_algorithm_identifier | 8 | uimbsf |
|     number_of_message_hashes | 8 | uimbsf |
|     for (i=0;i< number_of_hashes;i++) { | | |
|       reference_type | 8 | uimsbf |
|       reference_length | 8 | uimsbf |
|       for (j=0;j< reference_length;j++) { | | |
|         reference_byte | 8 | uimsbf |
|       } | | |

TABLE 11-continued

| Syntax | No. of Bits | Format |
| --- | --- | --- |
|       for (j=0;j< message_hash_length;j++) { | | |
|         message_hash_byte | 8 | uimsbf |
|       } | | |
|     } | | |
|     extension_length | 8 | uimbsf |
|     for (i=0;i< extension_length;i++) { | | |
|       extension_byte | 8 | uimsbf |
|     } | | |
|     signature_key_identifier_length | 8 | uimbsf |
|     for (i=0;i< signature_key_identifier_length;i++) { | | |
|       signature_key_identifier_byte | 8 | uimsbf |
|     } | | |
|     for (i=0;i< N;i++) {   //N is determined by the signature algorithm | | |
|       signature_byte | 8 | uimsbf |
|     } | | |
| } | | |

Table 12 and Table 13 represents the semantics of mmt_authentication_message( ).

TABLE 12 mmt_authentication_message( )

message_id - A 16-bit unsigned integer field that shall uniquely identify the mmt_authentication_message( ).
authentication_group_id - A 16-bit unsigned integer field that shall uniquely identify an authentication sub_table.
message_hash_algorithm_identifier - An 8-bit unsigned integer field that shall uniquely identify the hash algorithm used to create the hashes of signaling messages in the message_hash field.
message_hash_length - An 8-bit unsigned integer field that shall indicate the number of bytes of hash data present in the message_hash field. Its value shall not be greater than the length of the hash produced by the hash algorithm indicated by message_hash_algorithm_identifier field and shall not be less than 8. Its value may be smaller than the length of the hash produced by the hash algorithm, in which case the hash is truncated from the full length hash produced by the hash algorithm.
signature_algorithm_identifier - An 8-bit unsigned integer field that shall uniquely identify the algorithm used to calculate the signature conveyed in the signature field.
number_of_hashes - An 8-bit unsigned integer field that shall uniquely identify the number of hashes in this mmt_authentication_message( ).
reference_type - An 8-bit unsigned integer field that shall indicates how the signaling message associated with the following hash values can be located and identified. It can be coded as the following Table 13.

TABLE 13

| reference_type | Description |
| --- | --- |
| 0 | The signaling message is located on the same MMTP session with the same packet_id and is identified by a message_id value carried in the first and second referece_byte and by the message_hash it self. The reference_length field shall be set to 2. |
| 1 | The signaling message is located on the same MMTP session with a packet_id carried in the first and second reference_byte and is identified by a message_id value carried in the third and fourth referece_bytes and by the message_hash it self. The reference_length field shall be set to 4. |
| 2 | The signaling message is located on the MMTP session carried in the first 10 reference_byte with a packet_id carried in the $11^{th}$ and $12^{th}$ reference_byte and is identified by a message_id value carried in the $13^{th}$ and $14^{th}$ referece_bytes and by the message_hash it self. The reference_length field shall be set to 14. |
| 3 | The signaling message is mmt_atsc_message located on the same MMTP session with the same packet_id and identified by a atsc_message_content_type value carried in the first and second referece_byte and by the message_hash it self. The reference_length field shall be set to 2. |
| 4 | The signaling message is mmt_atsc_message located on the same MMTP session with a packet_id carried in the first and second reference_byte |

TABLE 13-continued

| reference_type | Description |
| --- | --- |
| | and is identified by a atsc_message_content_type value carried in the third and fourth referece_bytes and by the message_hash it self. The reference_length field shall be set to 4. |
| 5 | The signaling message is mmt_atsc_message located on the MMTP session carried in the first 10 reference_byte with a packet_id carried in the 11$^{th}$ and 12$^{th}$ reference_byte and is identified by a atsc_message_content_type value carried in the 13$^{th}$ and 14$^{th}$ referece_bytes and by the message_hash it self. The reference_length field shall be set to 14. | mmt_authentication_message( ) may contain the following elements. mmt_authentication_message( ) may include message_id that is a 16-bit unsigned integer field for uniquely identifying mmt_authentication_message( ) mmt_authentication_message( ) may include authentication_group_id that is a 16-bit unsigned integer field for uniquely identifying authentication sub_table. mmt_authentication_message( ) may include message_hash_algorithm_identifier, an eight-bit unsigned integer field for uniquely identifying the hash algorithm used to generate the hash of the signaling message in the message_hash field. mmt_authentication_message( ) may include message_hash_length, an eight-bit unsigned integer field to indicate the number of bytes of the hash data present in the message_hash field. The value of message_hash_length may not be smaller than eight and larger than the length of the hash produced by the hash algorithm indicated by the message_hash_algorithm_identifier field. Where the hash contained in mmt_authentication_message( ) only includes part of the entire length of hash produced by the hash algorithm, the message_hash_length value may be smaller than the entire length of the hash produced by the hash algorithm.

mmt_authentication_message( ) may include signature_algorithm_identifier, an eight-bit unsigned integer field for uniquely identifying the algorithm used to calculate the signature delivered in the signature field. mmt_authentication_message( ) may include number_of_hashes, a 8-bit unsigned integer field for uniquely identifying the number of the hashes of mmt_authentication_message( ) mmt_authentication_message( ) may include reference_type, an eight-bit unsigned integer field to indicate how the signaling message related to the subsequent hash value is positioned and identified.

reference_type may be coded as follows. Where reference_type is 0, the signaling message may be positioned in the same MMTP session having the same packet_id and may be identified by the first and second reference_bytes and the message_id value delivered by itself. The reference_length field may be set to 2. Where reference_type is 1, the signaling message may be positioned in the same MMTP session as the packet_id carried in the first and second reference_bytes and may be identified by the third and fourth reference_bytes and the message_id value delivered by itself. The reference_length field may be set to 4. Where reference_type is 2, the signaling message may be positioned in the MMTP session that, together with the packet_id contained in the 11th and 12th reference_bytes, is present in the first ten reference_bytes and may be identified by the message_hash and the message_id value present in the 13th and 14th reference_bytes. The reference_length field may be set to 14. Where reference_type is 3, the signaling message may be mmt_atsc_message, may be positioned in the same MMTP session having the same packet_id, and may be identified by the message_hash and atsc_message_content_type value carried in the first and second reference_bytes. The reference_length field may be set to 2. Where reference_type is 4, the signaling message may be mmt_atsc_message present in the same MMTP as the packet_id delivered in the first and second reference_bytes and may be identified by the atsc_message_content_type value delivered in the self_hash and the third and fourth reference_bytes. The reference_length field may be set to 4. Where reference_type is 5, the signaling message may be mmt_atsc_message positioned in the MMTP session that, together with the packet_id delivered in the 11th and 12th reference_bytes, is contained in the first ten reference_bytes and may be identified by the message_hash and the atsc_message_content_type value present in the 13th and 14th reference_bytes. The reference_length field may be set to 14.

mmt_authentication_message( ) may contain the following elements as well. mmt_authentication_message( ) may include reference_length, an eight-bit unsigned integer field for designating the length (bytes) of the next reference field. mmt_authentication_message( ) may include an eight-bit reference_byte for specifying the reference field in order. The syntax and meaning of the reference field may be defined by a reference mechanism as identified in the reference_type field. The encrypted hash of atsc3_messsage_content calculated using the hash algorithm displayed in the content_hash_algorithm_identifier field may be delivered via as many message_hash_bytes, which are eight-bit unsigned integer fields, as content_hash_length. mmt_authentication_message( ) may include signature_key_identifier_length, an eight-bit unsigned integer field indicating the number of bytes of the next signature_key_identifier field. mmt_authentication_message( ) may include as many signature_key_identifier bytes, which are eight-bit unsigned integer fields, as signature_key_identifier_length, which includes the whole or part of the public key identifier necessary to identify the signature contained in the signature field. The consecutive bytes contained in the signature_key_identifier_byte fields should match the cut-off identifier of the public key delivered by the reliability management mechanism. authentication_data( ) may include signature_byte, an eight-bit unsigned integer field containing the number of bytes of the signature for delivering the digital signature calculated using the algorithm designated in the signature_algorithm_identifier field. The input data for the signature algorithm may be the entire mmt_authentication_message( ) except for the signature_bytes. The number of the signature_bytes that exist may be determined by the key being used and the signature algorithm.

The input for the hash algorithm may be the whole or part of the message. At this time, the hash of the message may be only calculated from the message_payload except for the message_id, version, and length fields.

Table 14 below represents another example of the above-described mmt_atsc3_message( ).

TABLE 14

| Syntax | No. of Bits | Format |
|---|---|---|
| mmt_atsc3_message( ) { | | |
|   message_id | 16 | uimsbf |
|   version | 8 | uimsbf |
|   length | 32 | uimsbf |
|   message payload { | | |
|     service_id | 16 | uimsbf |
|     atsc3_message_content_type | 16 | uimbsf |
|     atsc3_message_content_version | 8 | uimbsf |
|     atsc3_message_content_compression | 8 | uimbsf |
|     URI_length | 8 | uimbsf |
|     for (i=0;i< URI_length;i++) { | | |
|       URI_byte | 8 | uimsbf |
|     } | | |
|     atsc3_message_content_length | 32 | uimsbf |
|     for (i=0;i<atsc3_message_content_length;i++) { | | |
|       atsc3_message_content_byte | 8 | uimsbf |
|     } | | |
|     atsc3_message_extension_length | 16 | uimsbf |
|     for (i=0;i<extension_length;i++) { | | |
|       atsc3_message_extension_byte | 8 | uimsbf |
|     } | | |
|     atsc3_signature_length | 16 | uimsbf |
|       for (i=0;<atsc3_signature_length;i++) { | | |
|       atsc3_signature_byte | 8 | uimsbf |
|     } | | |
|   } | | |
| } | | |

Each field shown in Table 14 may be the same in usage as what has been described above in connection with Table 5 except for the fields shown in Table 15. Table 15 below shows the semantics of mmt_atsc3_message.

TABLE 15 atsc3_message_extension_length - A 16-bit unsigned integer field that shall provide the length of the following extension bytes.
atsc3_message_extension_byte - An 8-bit unsigned integer field which is reserved for future use.
atsc3_signature_length - A 16-bit unsigned integer field that shall provide the length of the signature data contained in this message.
atsc3_signature_byte - An 8-bit unsigned integer field that shall contain a byte of the signature of this message. The atsc3_message_content_compression shall be applied to the signature content. The signature content shall be the signature across the sequence of bytes contained in the mmt_atsc3_message up to but not including the first atsc3_signature_byte, after any compression has been applied.

Although in the usage of the above-described atsc3_signature_byte, the compression algorithm (including non-compression) identified by the atsc3_message_content_compression field applies to both atsc3_message_content_byte and atsc3_signature_byte, a separate compression algorithm (including non-compression) may be applicable depending on implementations, and to indicate it, fields may be added.

In the embodiment shown in Table 14 above, upon receiving mmt_atsc3_message( ) the receiver may identify the value of the atsc3_signature_length field, determining whether the digital signature has applied to mmt_atsc3_message( ) Specifically, where the value of the atsc3_signature_length field is 0, it can be shown that the digital signature has not applied to mmt_atsc3_message( ) and where the value of the atsc3_signature_length field is larger than 0, it can be shown that the digital signature has applied to mmt_atsc3_message( ).

Table 16 below represents another example of the above-described mmt_signed_message( ). Table 17 shows the semantics of mmt_signed_message.

TABLE 16

| Syntax | No. of Bits | Format |
|---|---|---|
| mmt_signed_message( ) { | | |
|   message_id | 16 | uimsbf |
|   version | 8 | uimsbf |
|   length | 32 | uimsbf |
|   message payload { | | |
|     message( ) | | |
|     atsc3_signature_compression | 8 | uimsbf |
|     atsc3_signature_length | 16 | uimsbf |
|     for (i=0;i<atsc3_signature_length;i++) { | | |
|       atsc3_signature_byte | 8 | uimsbf |
|     } | | |
|   } | | |
| } | | |

TABLE 17 atsc3_signature_compression - An 8-bit unsigned integer field that shall identify the type of compression applied to the data in atc3_signature_byte.
atsc3_signature_length - A 16-bit unsigned integer field that shall provide the length of the signature data contained in this message.
atsc3_signature_byte - An 8-bit unsigned integer field that shall contain a byte of the signature of this message. The atsc3_signature_compression shall be applied to the signature content. The signature content shall be the signature across the sequence of bytes contained in the mmt_signed_message up to but not including the first atsc3_signature_byte, after any compression has been applied.

Although in the usage of the above-described mmt_signed_message( ) the compression algorithm (including non-compression) identified by the atsc3_signature_compression field only applies to atsc3_signature_byte, separate compression algorithms or the same compression algorithm (including non-compression) as that applied to atsc3_signature_byte may be applicable depending on implementations, and to indicate it, fields may be added.

According to an embodiment, mmt_signed_message( ) may be used to transmit various categories of signed MMT signaling messages. As an example, there is considered an MMT-based digital broadcast system using two categories of MMT signaling messages. The two categories may include a first category including signaling containing information for, e.g., normal streaming services and a second category including signaling containing information specified for a particular system. In the above-described embodiments, the MPEG-defined message may belong to the first category, and mmt_atsc3_message may belong to the second category. Further, as an example, among the above-described embodiments of mmt_signed_message( ), Table 8 above may be said to belong to the first category, and Table 15 above may be said to belong to the second category. In this case, each category may be determined by the range of the message_id field value contained in the MMT signaling. As an example, where the message_id value ranges from 0x0000 to 0x7FFF, the message may be determined to belong to the first category. Where the message_id value ranges from 0x8000 to 0xFFFF, the message may be determined to belong to the second category. In this case, identifying the individual messages relies on the messge_id value.

A method for providing a broadcast service is described below with reference to FIG. 11.

Figure 11:
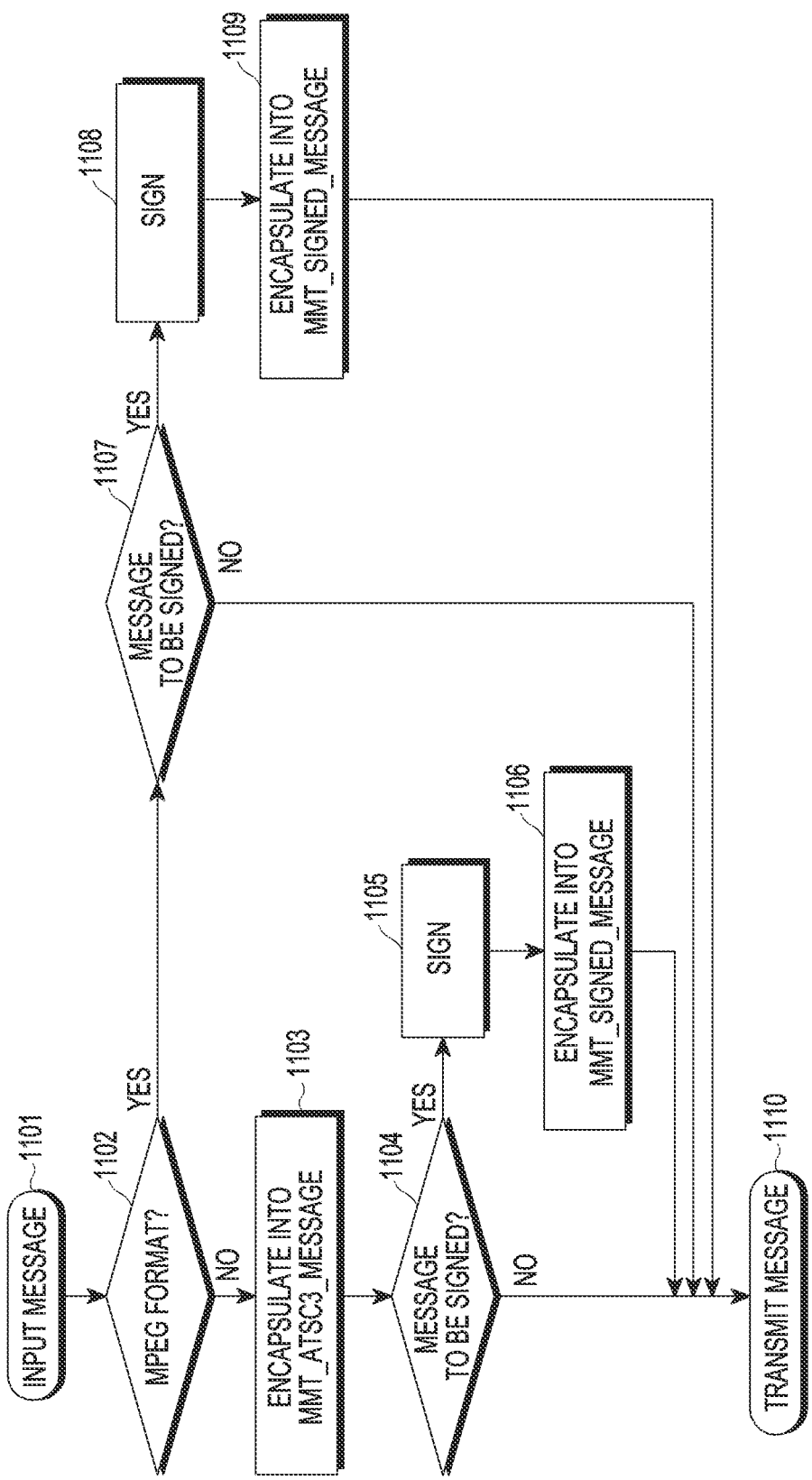
FIG. 11 is a flowchart illustrating a method in which a transmitting device provides a message for a broadcast service to a receiving device according to an embodiment of the disclosure.

FIG. 11 is a flowchart illustrating a method in which a transmitting device provides a message for a broadcast service to a receiving device according to an embodiment of the disclosure. The same part as what has been described in connection with the above embodiments is not repeatedly described.

Referring to FIG. 11, the transmitting device may identify an input message, at operation 1101, and may identify the format of the input message, at operation 1102. Where the input message is an MPEG-format (first category) message, the input message may be transmitted, as it is, when needed to be signed, at operation 1107, or may be encapsulated into the mmt_signed_message, at operation 1109, and transmitted along with the signature, at operation 1110, when needed to be signed, at operation 1107.

Where the input message is not an MPEG-format message but a message belonging to the second category, the input message may be encapsulated into the mmt_atsc3_message and transmitted, at operation 1103, or if needed to be signed, at operation 1104, the input message may be signed, at operation 1105, encapsulated again into the mmt_signed_message, at operation 1106, and transmitted along with the signature, at operation 1110.

A method for receiving a broadcast service is described below with reference to FIG. 12.

Figure 12:
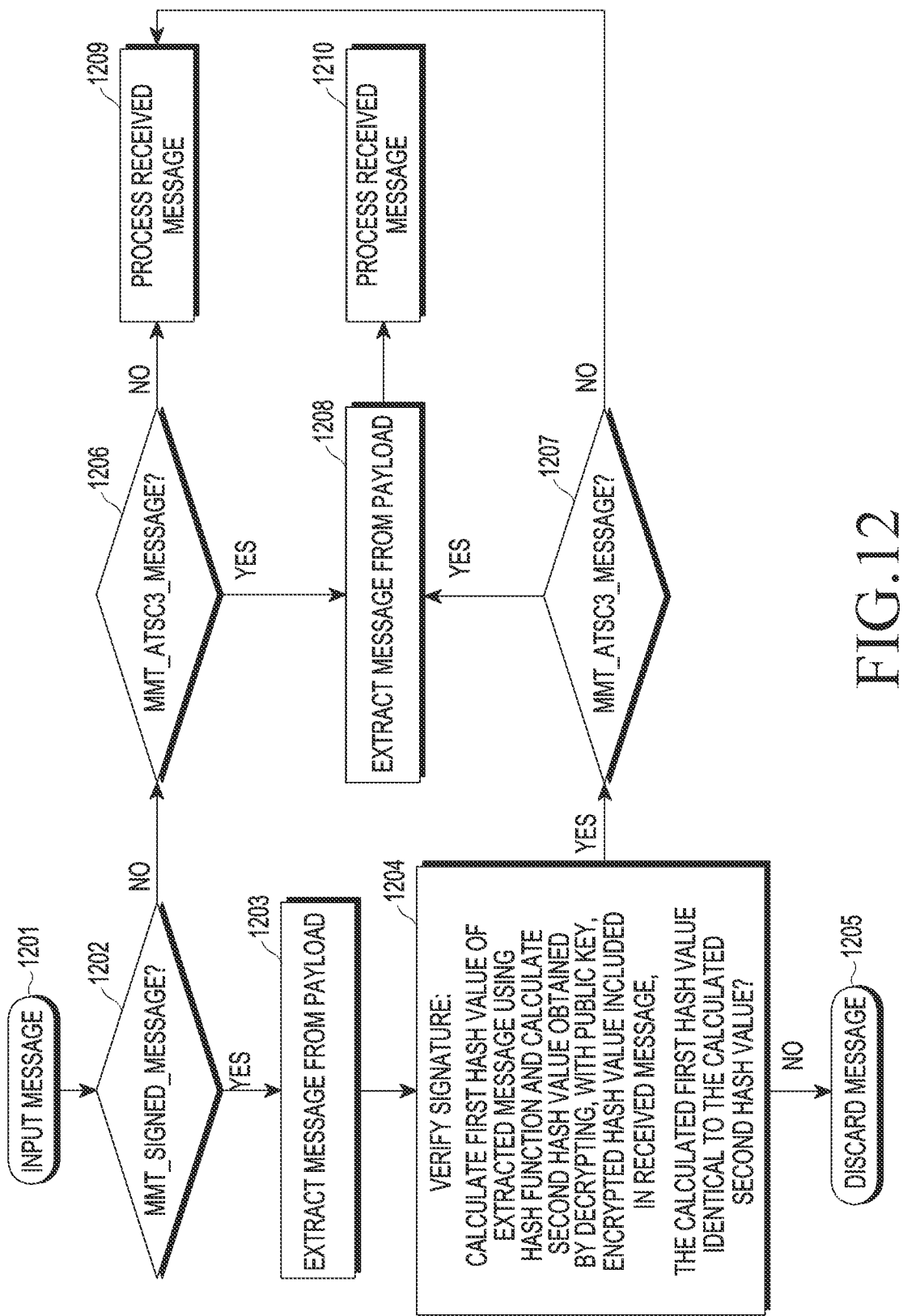
FIG. 12 is a flowchart illustrating a method in which a receiving device receives a message for a broadcast service from a transmitting device according to an embodiment of the disclosure.

FIG. 12 is a flowchart illustrating a method in which a receiving device receives a message for a broadcast service from a transmitting device according to an embodiment of the disclosure. The same part as what has been described in connection with the above embodiments is not repeatedly described.

Referring to FIG. 12, the receiving device may identify the message_id value of the received input message, at operation 1201, and determine whether the received message is a signed message, at operation 1202. Here, the mmt_signed_message may denote a signed message. Where the received message is not a signed message, the receiving device may determine whether the received message is an MPEG-defined message (the first category) or mmt_atsc3_message (the second category) using the message_id field, at operation 1206, and may process the content of the message by performing processing fitting each format. Unless the received message is the mmt_atsc3_message (second category), the receiving device processes the received message, at operation 1209, and where the received message is the mmt_atsc3_message (second category), the receiving device may extract the message of the payload, at operation 1208, and process the extracted message, at operation 1210.

Where the received message is a signed message, at operation 1202, the receiving device may extract the message of the payload, at operation 1203, and verify the signature, at operation 1204. Verifying the signature is the same as what has been described in connection with the above embodiments and no description thereof is thus given below. Upon failing to verify the signature, the receiving device discards the received message, at operation 1205. If the signature is verified, the receiving device may determine whether the received message is the mmt_atsc3_message (second category), at operation 1207, and process the content of the message in the same manner as is applied to unsigned messages.

As is apparent from the foregoing description, according to the disclosure, the recipient may be aware of the occurrence of a variation or error in information and may thus receive the broadcast service correctly.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for receiving a broadcast service by a device, the method comprising:
   receiving, via a receiver of the device, a first packet including a packet header and a packet payload; and
   process the received first packet,
   wherein the packet payload comprises a first message,
   wherein the first message comprises:
      information indicating an identifier of the first message,
      information indicating a version of the first message,
      information related to a length of the first message, and
      a message payload of the first message,
   wherein the message payload of the first message comprises:
      a second message which is a Moving Picture Experts Group (MPEG) Media Transport (MMT) signaling message,
      information containing at least one byte of a signature for the second message, and
      information indicating a length of data of the signature,
   wherein the second message comprises:
      information indicating an identifier of the second message,
      information indicating a version of the second message,
      information related to a length of the second message, and
      a message payload of the second message, and
   wherein the message payload of the second message comprises:
      information for associating the message payload of the second message with a service identified in a serviceId attribute given in a service list table (SLT),
      signaling information for the broadcast service, and
      information indicating a type of message content in the message payload of the second message.

2. The method of claim 1, further comprising:
   receiving, via the receiver of the device, a second packet including a third message which is a low-level signaling,
   wherein the third message comprises an identifier of a key for verifying the information of the signature for the second message, and
   wherein the third message further includes an identifier of a hash algorithm for calculating a hash value of the second message.

3. The method of claim 1, wherein the signaling information comprised in the second message is specific to an advanced television systems committee (ATSC) 3.0 service.

4. The method of claim 2, wherein the signature for the second message is formed by calculating the hash value using the hash algorithm and encrypting the hash value using the key.

5. A device for receiving a broadcast service, the device comprising:
   a memory;
   a transmitter;
   a receiver; and
   at least one processor electrically coupled to the memory, the transmitter, and the receiver,
   wherein the memory is configured to store one or more computer programs including instructions which, when executed by the at least one processor, cause the at least one processor to:

receive, via the receiver, a first packet including a packet header and a packet payload, and
process the received first packet,
wherein the packet payload comprises a first message,
wherein the first message comprises:
information indicating an identifier of the first message,
information indicating a version of the first message,
information related to a length of the first message, and
a message payload of the first message,
wherein the message payload of the first message comprises:
a second message which is a Moving Picture Experts Group (MPEG) Media Transport (MMT) signaling message,
information containing at least one byte of a signature for the second message, and
information indicating a length of data of the signature,
wherein the second message comprises:
information indicating an identifier of the second message,
information indicating a version of the second message,
information related to a length of the second message, and
a message payload of the second message, and
wherein the message payload of the second message comprises:
information for associating the message payload of the second message with a service identified in a serviceId attribute given in a service list table (SLT),
signaling information for the broadcast service, and
information indicating a type of message content in the message payload of the second message.

6. The device of claim 5,
wherein the instructions, when executed by the at least one processor, further cause the at least one processor to control the receiver to receive a second packet including a third message which is a low-level signaling,
wherein the third message comprises an identifier of a key for verifying the information of the signature for the second message, and
wherein the third message further includes an identifier of a hash algorithm for calculating a hash value of the second message.

7. The device of claim 5, wherein the signaling information comprised in the second message is specific to an advanced television systems committee (ATSC) 3.0 service.

8. The device of claim 6, wherein the signature for the second message is formed by calculating the hash value using the hash algorithm and encrypting the hash value using the key.

* * * * *